United States Patent
Xie et al.

(10) Patent No.: US 12,299,128 B2
(45) Date of Patent: May 13, 2025

(54) INSECURE SOFTWARE DETECTION APPARATUS AND DETECTION METHOD, AND STORAGE MEDIUM

(71) Applicant: HUAWEI TECHNOLOGIES CO., LTD., Guangdong (CN)

(72) Inventors: Meilun Xie, Shenzhen (CN); Shilin Pan, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 279 days.

(21) Appl. No.: 18/046,147

(22) Filed: Oct. 12, 2022

(65) Prior Publication Data

US 2023/0057717 A1 Feb. 23, 2023

Related U.S. Application Data

(63) Continuation of application No. PCT/CN2020/084438, filed on Apr. 13, 2020.

(51) Int. Cl.
*G06F 21/00* (2013.01)
*G06F 21/55* (2013.01)
*G06F 21/56* (2013.01)

(52) U.S. Cl.
CPC .......... *G06F 21/566* (2013.01); *G06F 21/554* (2013.01); *G06F 2221/033* (2013.01)

(58) Field of Classification Search
CPC .................. G06F 21/566; G06F 21/554; G06F 2221/033; G06N 3/045; G06N 3/063
See application file for complete search history.

(56) References Cited

U.S. PATENT DOCUMENTS

| | | | | |
|---|---|---|---|---|
| 9,262,632 | B2* | 2/2016 | Reed | H04L 9/3247 |
| 9,298,909 | B2* | 3/2016 | Du | G06F 1/28 |
| 11,227,047 | B1* | 1/2022 | Vashisht | G06F 21/56 |
| 2013/0124436 | A1* | 5/2013 | Cardenas Mora | G06F 17/18 |
| | | | | 706/12 |

(Continued)

FOREIGN PATENT DOCUMENTS

CN 110392056 A 10/2019

OTHER PUBLICATIONS

Jung, Woosub, et al. "IoT botnet detection via power consumption modeling." Smart Health 15 (2020): 100103. (Year: 2020).*

*Primary Examiner* — Ka Shan Choy

(57) ABSTRACT

An insecure software detection apparatus is provided, including: a dedicated processor (101), configured to: when a first analysis result indicates that to-be-detected software is not secure, analyze the to-be-detected software by using a first neural network model, to obtain a second analysis result, where the first analysis result is obtained by analyzing the to-be-detected software by using a second neural network model; and a general-purpose processor (102), configured to: obtain the second analysis result from the dedicated processor, and perform security processing on the to-be-detected software based on the second analysis result. The apparatus first analyzes the to-be-detected software by using the second neural network model with low power consumption. When an analysis result indicates that the to-be-detected software is not secure, the dedicated processor analyzes the to-be-detected software by using the first neural network model with a high computing capability.

17 Claims, 7 Drawing Sheets

(56) References Cited

U.S. PATENT DOCUMENTS

| | | | |
|---|---|---|---|
| 2018/0039779 A1* | 2/2018 | Li | G06F 21/56 |
| 2019/0294792 A1* | 9/2019 | Singh | G06F 21/577 |
| 2022/0036208 A1* | 2/2022 | Rao | H04L 63/145 |

* cited by examiner

INSECURE SOFTWARE DETECTION APPARATUS AND DETECTION METHOD, AND STORAGE MEDIUM

CROSS-REFERENCE TO RELATED APPLICATIONS

This application is a continuation of International Application No. PCT/CN2020/084438, filed on Apr. 13, 2020, the disclosure of which is hereby incorporated by reference in its entirety.

TECHNICAL FIELD

This application relates to the field of electronic technologies, and specifically, to an insecure software detection apparatus and detection method, and a storage medium.

BACKGROUND

As smartphones become more popular, more insecure software runs on the smartphones. With continuous damage caused by the insecure software and a large quantity of security events caused by the insecure software in recent years, a user has an increasing requirement for an insecure software defense capability of the smartphones.

An identification method based on software characterization (such as a software signature) used by conventional antivirus software does not have a capability of detecting software behavior in real time. Conventional dynamic and static detection methods use software shallow behavior features (such as permission application and software system invoking) for detection, and cannot detect deeper system information (such as system semaphore and an underlying system structure). Therefore, how to provide a method for in-depth detection of a software threat behavior by combining a powerful computing capability of a cloud and artificial intelligence (AI) is of great significance to improve a user security protection capability of commercial mobile phones and enhance competitiveness of the smartphones in a terminal market.

To meet the requirement of a user, a conventional security solution mainly emphasizes a cloud-based virus scanning and removing function. To be specific, strict security detection and review are performed when software is released in an application store, and insecure software is prevented from being released in the application store based on a detection result. However, there are many detection blind spots when a cloud-based virus scanning and removing manner is applied to the smartphones. Insecure software can use countermeasures such as dynamic code loading and junk code to avoid virus scanning and removing performed by a conventional insecure behavior detection engine (including various types of antivirus software) during release and before installation. Some software works normally when the software is released in the application store, but insecure instructions are dynamically added after the software is released for a period of time, to bypass security detection when the software is released. In addition, insecure software can enter the smartphones through a third-party channel to bypass the cloud-based virus scanning and removing performed by an application store of a terminal vendor. Therefore, in addition to the cloud-based virus scanning and removing function, a cloud service provider also uses machine learning and artificial intelligence to detect the insecure software. For example, a detection solution may include: upgrading a cloud-based security analysis platform provided by the cloud service provider from signature-based feature detection to machine learning-based intelligent detection; using a machine learning technology to implement insecure software behavior classification detection, application privacy and permission detection, Root attack detection, and the like; and using an AI detection technology based on a neural network processing unit (NPU) on a terminal side. An NPU is currently integrated into a system on chip (SoC) in the smartphones. Therefore, a real-time insecure behavior detection solution in which machine learning is performed on a cloud side and AI detection is performed on a terminal side can be implemented.

However, when the foregoing insecure software detection solution based on machine learning and AI is applied to the smartphones, an actual evaluation indicator detection rate is low, a false positive rate is high, and commercial feedback is poor. In addition, a current commercial model is a large FLOAT16 model, and a computation amount of the SoC is large. This results in high power consumption. How to reduce power consumption while ensuring detection accuracy of insecure software is an urgent problem to be resolved.

SUMMARY

Embodiments of this application provide an insecure software detection apparatus and detection method, and a storage medium, to reduce power consumption while ensuring detection accuracy of insecure software. To achieve the foregoing objective, this application provides the following technical solutions.

A first aspect of embodiments of this application provides an insecure software detection apparatus, including a dedicated processor, configured to: when a first analysis result indicates that to-be-detected software is not secure, analyze the to-be-detected software by using a first neural network model, to obtain a second analysis result, where the first analysis result is obtained by analyzing the to-be-detected software by using a second neural network model, the second analysis result indicates that the to-be-detected software is not secure, power consumption of the first neural network model is greater than power consumption of the second neural network model, and a computing capability of the first neural network model is greater than a computing capability of the second neural network model. For example, the first neural network model may be an INT8 model, and the second neural network model may be a FLOAT16 model, a FLOAT32 model, or the like. The dedicated processor is a processor configured to perform neural network operation processing, and can perform an artificial intelligence operation. For example, the dedicated processor may include one or more NPUs. The to-be-detected software being not secure may indicate that the to-be-detected software is insecure software or a virus, or indicate that the to-be-detected software may perform an insecure operation, or the like. The insecure software detection apparatus further includes a general-purpose processor, configured to: obtain the second analysis result from the dedicated processor, and perform security processing on the to-be-detected software based on the second analysis result. The general-purpose processor is an operation and control core of a computing security system of the insecure software detection apparatus, and may be, for example, a CPU or an MCU.

It may be learned from the first aspect that the insecure software detection apparatus first analyzes the to-be-detected software by using the second neural network model with low power consumption. When the first analysis result obtained through analysis indicates that the to-be-detected software is not secure, the dedicated processor analyzes the to-be-detected software by using the first neural network model with a high computing capability, to obtain the second analysis result. The general-purpose processor then determines, based on the second analysis result, whether the to-be-detected software is insecure software. Therefore, power consumption is reduced while ensuring detection accuracy of the insecure software.

With reference to the first aspect of embodiments of this application, in a first implementation of the first aspect of embodiments of this application, the second neural network model is used to perform real-time analysis on the to-be-detected software.

It may be learned from the first implementation of the first aspect that, because the power consumption of the second neural network model is low, the second neural network model is used to analyze the to-be-detected software in real time, so that real-time analysis on the to-be-detected software with low power consumption may be implemented.

With reference to the first aspect or the first implementation of the first aspect of embodiments of this application, in a second implementation of the first aspect of embodiments of this application, the dedicated processor is further configured to: analyze the to-be-detected software by using the second neural network model, to obtain the first analysis result; and when the first analysis result indicates that the to-be-detected software is not secure, activate a first neural network. For example, the dedicated processor may include only one neural network processing unit.

In the foregoing solution, two models are used to detect the to-be-detected software. The neural network processing unit may first analyze the to-be-detected software by using the second neural network model with low power consumption. When the first analysis result obtained through analysis indicates that the to-be-detected software is not secure, the neural network processing unit uses the first neural network model with a high computing capability, and then the general-purpose processor determines, based on the second analysis result, whether the to-be-detected software is insecure software. Therefore, power consumption is reduced while ensuring detection accuracy of the insecure software.

With reference to the first aspect or the first implementation of the first aspect of embodiments of this application, in a third implementation of the first aspect of embodiments of this application, the dedicated processor includes a first neural network processing unit and a second neural network processing unit. For example, the first neural network processing unit and the second neural network processing unit are two different NPUs, that is, an NPU 1 and an NPU 2. The NPU 1 has a small area, high energy efficiency, and ultra-low power consumption, and can perform continuous AI processing by using the second neural network model. The NPU 2 has a large area and a high computing capability, and can implement high accuracy and coverage by using the first neural network model. The first neural network processing unit is configured to analyze the to-be-detected software by using the second neural network model, to obtain the first analysis result. The second neural network processing unit is configured to: when the first analysis result indicates that the to-be-detected software is not secure, activate the first neural network model, and analyze the to-be-detected software to obtain the second analysis result.

It may be learned from the third implementation of the first aspect that the dedicated processor may include two different neural network processing units, and the two different neural network processing units separately detect the to-be-detected software by using different neural network models. Therefore, diversity of the solution is increased.

With reference to the first aspect or the first implementation of the first aspect of embodiments of this application, in a fourth implementation of the first aspect of embodiments of this application, the general-purpose processor is further configured to: analyze the to-be-detected software by using the second neural network model, to obtain the first analysis result; and when the first analysis result indicates that the to-be-detected software is not secure, activate the dedicated processor; and the dedicated processor is specifically configured to: respond to activation, and analyze the to-be-detected software by using the first neural network model. For example, the dedicated processor includes a neural network processing unit.

It may be learned from the fourth implementation of the first aspect that first analysis result may be obtained by the dedicated processor through analysis by using the second neural network model, or may be obtained by the general-purpose processor by using the second neural network model. Therefore, diversity of the solution is increased.

With reference to any one of the first aspect or the first to the fourth possible implementations of the first aspect of embodiments of this application, in a fifth implementation of the first aspect of embodiments of this application, the first analysis result is obtained by analyzing, by using the second neural network model, a first observation event corresponding to the to-be-detected software. A behavior observation platform may be disposed at a software architecture layer or a kernel layer to monitor the to-be-detected software. An observation event at the software architecture layer may include one or more of the following events: a lock screen event and a message, a window management event and a message, a focus event and a message, a location management event and a message, an application package and security management event and a message, a call, an SIM card event and a message, an SMS message event and a message, or a permission application event. The observation event monitored by the behavior observation platform disposed at the kernel layer may include one or more of observation events corresponding to the following six system application programming interfaces (API). The six system APIs are open, rename, renameat, unlink, unlinkat, or rmdir. The first observation event may include one or more of a plurality of observation events that need to be monitored and that are set at at least one of the software architecture layer or the kernel layer.

With reference to any one of the first aspect or the first to the fifth possible implementations of the first aspect of embodiments of this application, in a sixth implementation of the first aspect of embodiments of this application, the second analysis result is obtained by analyzing, by using the first neural network model, a second observation event corresponding to the to-be-detected software. A behavior observation platform may be disposed at a software architecture layer or a kernel layer to monitor the to-be-detected software. An observation event at the software architecture layer may include one or more of the following events: a lock screen event and a message, a window management event and a message, a focus event and a message, a location management event and a message, an application package and security management event and a message, a call and a message, an SIM card event and a message, an SMS message event and a message, or a permission application event. The observation event monitored by the behavior observation platform disposed at the kernel layer may include one or more of observation events corresponding to the following six system application programming interfaces (API). The six system APIs are open, rename, renameat, unlink, unlinkat, or rmdir. The first observation event may include one or more of a plurality of observation events that need to be monitored and that are set at at least one of the software architecture layer or the kernel layer. The first observation event and the second observation event may be the same or partially the same, or may be completely different.

With reference to any one of the first aspect or the first to the sixth possible implementations of the first aspect of embodiments of this application, in a seventh implementation of the first aspect of embodiments of this application, the security processing includes at least one of the following: stopping running the to-be-detected software, limiting at least a part of functions of the to-be-detected software, triggering an alarm, or further performing security detection on the to-be-detected software.

With reference to any one of the first aspect or the first to the seventh possible implementations of the first aspect of embodiments of this application, in an eighth implementation of the first aspect of embodiments of this application, the general-purpose processor is further configured to obtain the second analysis result from the dedicated processor, and is specifically configured to perform the security processing on the to-be-detected software based on the first analysis result and the second analysis result.

With reference to any one of the first aspect or the first to the eighth possible implementations of the first aspect of embodiments of this application, in a ninth implementation of the first aspect of embodiments of this application, the second analysis result further indicates a non-security type of the to-be-detected software. The non-security type of the to-be-detected software may be one or more of the following non-security types: insecure fee deduction, privacy theft, ransomware, insecure information spreading, tariff increase, system attack, fraud, or hooliganism.

With reference to any one of the first aspect or the first to the ninth possible implementations of the first aspect of embodiments of this application, in a tenth implementation of the first aspect of embodiments of this application, a timer may be further configured for the dedicated processor. When the timer expires, the dedicated processor automatically enables the first neural network model to analyze the to-be-detected software to obtain an analysis result. This avoids a case in which missing detection occurs when the to-be-detected software is detected by using the second neural network model.

A second aspect of embodiments of this application provides an insecure software detection method, including: When a first analysis result indicates that to-be-detected software is not secure, a dedicated processor analyzes the to-be-detected software by using a first neural network model, to obtain a second analysis result, where the first analysis result is obtained by analyzing the to-be-detected software by using a second neural network model, the second analysis result indicates that the to-be-detected software is not secure, power consumption of the first neural network model is greater than power consumption of the second neural network model, and a computing capability of the first neural network model is greater than a computing capability of the second neural network model; and a general-purpose processor performs security processing on the to-be-detected software based on the second analysis result.

With reference to the second aspect of embodiments of this application, in a first implementation of the second aspect of embodiments of this application, the second neural network model is used to perform real-time analysis on the to-be-detected software.

With reference to the second aspect or the first implementation of the second aspect of embodiments of this application, in a second implementation of the second aspect of embodiments of this application, the method further includes: The dedicated processor analyzes the to-be-detected software by using the second neural network model, to obtain the first analysis result.

With reference to the second aspect or the first implementation of the second aspect of embodiments of this application, in a third implementation of the second aspect of embodiments of this application, the dedicated processor includes a first neural network processing unit and a second neural network processing unit, and the method further includes: The first neural network processing unit analyzes the to-be-detected software by using the second neural network model, to obtain the first analysis result; and a dedicated processor analyzes the to-be-detected software by using a first neural network model, to obtain a second analysis result includes: When the first analysis result indicates that the to-be-detected software is not secure, and the second neural network processing unit enables the first neural network model, and analyzes the to-be-detected by using the first neural network model, to obtain the second analysis result.

With reference to the second aspect or the first implementation of the second aspect of embodiments of this application, in a fourth implementation of the second aspect of embodiments of this application, the method further includes: The general-purpose processor analyzes the to-be-detected software by using the second neural network model, to obtain the first analysis result.

With reference to any one of the second aspect or the first to the fourth possible implementations of the second aspect of embodiments of this application, in a fifth implementation of the second aspect of embodiments of this application, the first analysis result is obtained by analyzing, by using the second neural network model, a first observation event corresponding to the to-be-detected software.

With reference to any one of the second aspect or the first to the fifth possible implementations of the second aspect of embodiments of this application, in a sixth implementation of the second aspect of embodiments of this application, the second analysis result is obtained by analyzing, by using the first neural network model, a second observation event corresponding to the to-be-detected software.

With reference to any one of the second aspect or the first to the sixth possible implementations of the second aspect of embodiments of this application, in a seventh implementation of the second aspect of embodiments of this application, the security processing includes at least one of the following: stopping running the to-be-detected software, limiting at least a part of functions of the to-be-detected software, triggering an alarm, or further performing security detection on the to-be-detected software.

With reference to any one of the second aspect or the first to the seventh possible implementations of the second aspect of embodiments of this application, in an eighth implementation of the second aspect of embodiments of this application, that a general-purpose processor performs security processing on the to-be-detected software based on the second analysis result includes: The general-purpose processor performs the security processing on the to-be-detected software based on the first analysis result and the second analysis result.

With reference to any one of the second aspect or the first to the eighth possible implementations of the second aspect of embodiments of this application, in a ninth implementation of the second aspect of embodiments of this application, the second analysis result further indicates a non-security type of the to-be-detected software.

With reference to any one of the second aspect or the first to the ninth possible implementations of the second aspect of embodiments of this application, in a tenth implementation of the second aspect of embodiments of this application, a timer may be further configured for the dedicated processor. When the timer expires, the dedicated processor automatically enables the first neural network model to analyze the to-be-detected software to obtain an analysis result. This avoids a case in which missing detection occurs when the to-be-detected software is detected by using the second neural network model.

A third aspect of this application provides an insecure software detection apparatus, including: a first analysis module, configured to: when a first analysis result indicates that to-be-detected software is not secure, analyze the to-be-detected software by using a first neural network model, to obtain a second analysis result, where the first analysis result is obtained by analyzing the to-be-detected software by using a second neural network model, the second analysis result indicates that the to-be-detected software is not secure, power consumption of the first neural network model is greater than power consumption of the second neural network model, and a computing capability of the first neural network model is greater than a computing capability of the second neural network model; and a security processing module, configured to perform security processing on the to-be-detected software based on the second analysis result obtained through analysis by the first analysis module.

With reference to the third aspect of embodiments of this application, in a first possible implementation of the third aspect of embodiments of this application, the second neural network model is used to perform real-time analysis on the to-be-detected software.

With reference to the third aspect or the first possible implementation of the third aspect of embodiments of this application, in a second possible implementation of the third aspect of embodiments of this application, the first analysis module is further configured to: before analyzing the to-be-detected software by using the first neural network model, analyze the to-be-detected software by using the second neural network model, to obtain the first analysis result.

With reference to the third aspect or the first possible implementation of the third aspect of embodiments of this application, in a third possible implementation of the third aspect of embodiments of this application, the insecure software detection apparatus further includes: a second analysis module, configured to analyze the to-be-detected software by using the second neural network model, to obtain the first analysis result. Correspondingly, the first analysis module is configured to: when the first analysis result obtained by the second analysis module through analysis indicates that the to-be-detected software is not secure, enable a first neural network model, and analyze the to-be-detected software by using the first neural network model, to obtain the second analysis result.

With reference to any one of the third aspect or the first to the third possible implementations of the third aspect of embodiments of this application, in a fourth possible implementation of the third aspect of embodiments of this application, the first analysis result is obtained by analyzing, by using the second neural network model, a first observation event corresponding to the to-be-detected software.

With reference to any one of the third aspect or the first to the fourth possible implementations of the third aspect of embodiments of this application, in a fifth possible implementation of the third aspect of embodiments of this application, the second analysis result is obtained by the first analysis module or the second analysis module by analyzing, by using the first neural network model, a second observation event corresponding to the to-be-detected software.

With reference to any one of the third aspect or the first to the fifth possible implementations of the third aspect of embodiments of this application, in a sixth possible implementation of the third aspect of embodiments of this application, the security processing includes at least one of the following: stopping running the to-be-detected software, limiting at least a part of functions of the to-be-detected software, triggering an alarm, or further performing security detection on the to-be-detected software.

With reference to any one of the third aspect or the first to the sixth possible implementations of the third aspect of embodiments of this application, in a seventh possible implementation of the third aspect of embodiments of this application, the security processing module is configured to perform the security processing on the to-be-detected software based on the first analysis result and the second analysis result.

With reference to any one of the third aspect or the first to the seventh possible implementations of the third aspect of embodiments of this application, in an eighth possible implementation of the third aspect of embodiments of this application, the second analysis result further indicates a non-security type of the to-be-detected software.

A fourth aspect of this application provides an electronic device. The electronic device includes a dedicated processor, a general-purpose processor, and a memory. The memory stores program instructions. At least one of the dedicated processor and the general-purpose processor is configured to execute the program instructions stored in the memory, to enable the electronic device to perform the insecure software detection method in any one of the second aspect or the possible implementations of the second aspect.

A fifth aspect of this application provides a computer-readable storage medium. The computer-readable storage medium stores instructions. When the instructions are run on an electronic device, the electronic device is enabled to perform the insecure software detection method in any one of the second aspect or the possible implementations of the second aspect.

A sixth aspect of this application provides a computer program product including instructions. When the computer program product is run on an electronic device, the electronic device is enabled to perform the insecure software detection method in any one of the second aspect or the possible implementations of the second aspect.

In the technical solution provided in embodiments of this application, the to-be-detected software is first analyzed by using the second neural network model with low power consumption. When the first analysis result obtained through analysis indicates that the to-be-detected software is not secure, the dedicated processor analyzes the to-be-detected software by using the first neural network model with a high computing capability, to obtain the second analysis result. The general-purpose processor then determines, based on the second analysis result, whether the to-be-detected software is insecure software. Therefore, power consumption is reduced while ensuring detection accuracy of the insecure software.

DESCRIPTION OF EMBODIMENTS

Embodiments of this application provide an insecure software detection apparatus and detection method, to reduce power consumption while ensuring detection accuracy of insecure software.

To make a person skilled in the art understand the technical solutions in this application better, the following clearly describes the technical solutions in embodiments of this application with reference to the accompanying drawings in embodiments of this application. It is clearly that described embodiments are merely some but not all of embodiments of this application. A person of ordinary skill in the art may learn that, with emergence of a new application scenario, the technical solutions provided in embodiments of this application are also applicable to a similar technical problem, and all other embodiments obtained by a person of ordinary skill in the art based on embodiments provided in this application shall fall within the protection scope of this application.

In the specification, claims, and accompanying drawings of this application, the terms "first", "second", and the like are intended to distinguish between similar objects but do not necessarily indicate a specific order or sequence. It should be understood that the data termed in such a way are interchangeable in proper circumstances so that embodiments described herein can be implemented in other orders than the order illustrated or described herein. In addition, the terms "include" and "have" and any other variants mean to cover the non-exclusive inclusion, for example, a process, method, system, product, or device that includes a list of steps or units is not necessarily limited to those units, but may include other units not expressly listed or inherent to such a process, method, product, or device. The following describes embodiments of this application.

Figure 1:
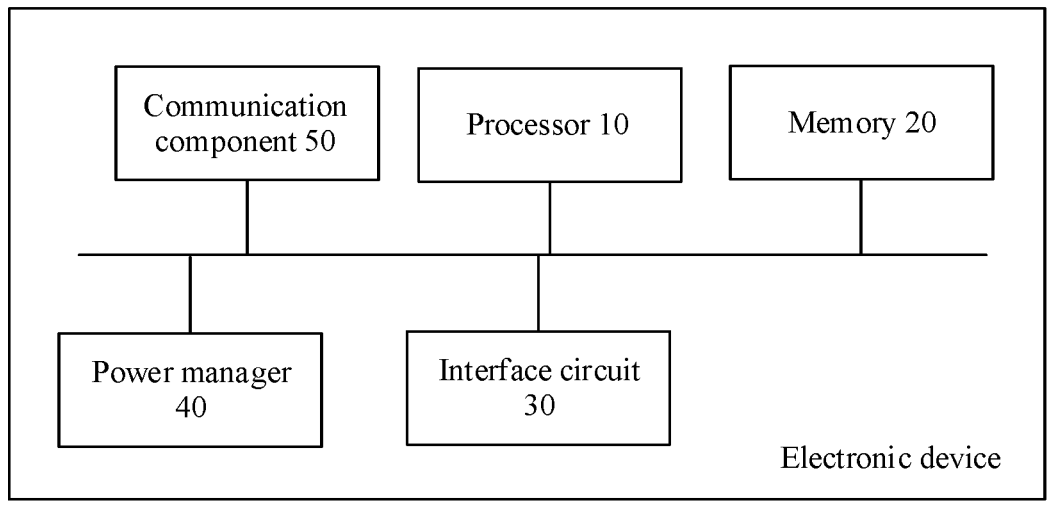
FIG. 1 is a schematic diagram of a structure of an electronic device according to an embodiment of this application.

An embodiment of this application first provides an electronic device. FIG. 1 is a simplified schematic diagram of a structure of an electronic device according to an embodiment of this application. For ease of description, only a part related to the present invention is shown. For specific technical details that are not disclosed, refer to the method part in embodiments of the present invention in the following. This shall not be understood as a limitation on this application.

Refer to FIG. 1. The electronic device provided in an embodiment of this application includes a processor 10, a memory 20, an interface circuit 30, a power manager 40, and a communication component 50. The processor 10 may be coupled to the memory 20, the interface circuit 30, the power manager 40, and the communication component 50, and may be specifically connected to each other through at least one bus or by using another interface. It may be understood that the interface circuit 30 may be an input/output interface, and may be configured to connect the electronic device to another device, such as another chip, a circuit board, an external memory, a peripheral, or a sensor.

The power manager 40 provides power supply voltages required by the processor 10, the memory 20, and the interface circuit 30 for working, and may further provide clocks required by the processor 10, the memory 20, and the interface circuit 30 for working. Optionally, the power manager 40 may convert energy from a battery or energy from a wall-mounted power supply into voltages required by the processor 10, the memory 20, and the interface circuit 30 for working. Optionally, the power manager 40 may generate, by using a basic clock, for example, a crystal oscillator clock, the clocks required by the processor 10, the memory 20, and the interface circuit 30 for working. This is not limited in this embodiment. Optionally, the power manager 40 includes a power management chip, and the power management chip includes circuits such as a voltage generator and a clock generator.

The communication component 50 is configured to implement an external communication function of the electronic device, including but not limited to wired communication and wireless communication. The wireless communication includes but is not limited to short-range wireless communication and cellular wireless communication, and a specific communication form is not limited in this embodiment.

Alternatively, the processor 10 may be implemented by using a processing chip, a board, a processing module, or a processing apparatus. The processor 10 is a control center of the electronic device, and is connected to all parts of the entire electronic device by using various interfaces and lines. The processor 10 executes various function applications of the electronic device and processes data by running a software program or a software module stored in the memory 20 and invoking data stored in the memory 20, to perform overall monitoring on the electronic device.

The memory 20 may be configured to store a software program and a module. The memory may mainly include a program storage area and a data storage area. The program storage area may store an operating system, an application program required by at least one function, or the like, and may further include another type of a driver, for example, a driver related to communication, an image, a video, voice, or artificial intelligence. The data storage area may store data created based on use of the electronic device, or may store other user data, security data, system data, or the like. In addition, the memory may include a high-speed random access memory, and may further include a non-volatile memory, for example, at least one disk storage device, a flash memory device, or another volatile solid-state storage device. For ease of description, FIG. 1 shows only one memory. In an actual electronic device product, there may be one or more memories. The memory may also be referred to as a storage medium, a storage device, or the like. The memory may be disposed independent of the processor, or may be integrated with the processor. This is not limited in this embodiment of this application.

An electronic device in this embodiment of this application may be user equipment (UE), an access terminal, a subscriber unit, a subscriber station, a mobile station, a mobile console, a remote station, a remote terminal, a mobile device, a user terminal, a terminal, a wireless communication device, a user agent, or a user apparatus, or may be a mobile device supporting 5G new radio (NR). Typically, the electronic device in this embodiment of this application may be a smartphone. In addition, the electronic device may alternatively be a tablet computer, a portable notebook computer, a virtual/hybrid/augmented reality device, a navigation device, a television set, a computing device, a vehicle-mounted device, a wearable device, a set-top box, a terminal device in another future communication system, or the like. This is not limited in this embodiment of this application, and the terminal device is used as an example in the following description.

Figure 2:
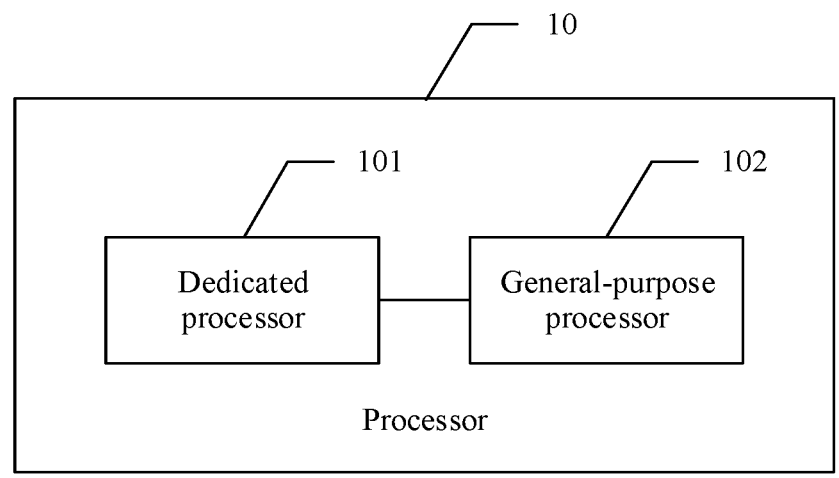
FIG. 2 is a schematic diagram of a structure of a processor according to an embodiment of this application.

In this embodiment of this application, the processor 10 of the electronic device has an AI computing capability, and the processor 10 includes a dedicated processor 101 and a general-purpose processor 102. FIG. 2 is a schematic diagram of a structure of the processor 10 according to an embodiment of this application. Specifically, with reference to FIG. 1, the dedicated processor 101, the general-purpose processor 102, the memory 20, and the interface circuit 30 are coupled to each other. Specifically, the memory 20 is configured to store instructions executed by at least one of the dedicated processor 101 or the general-purpose processor 102, input data required for running the instructions by at least one of the dedicated processor 101 or the general-purpose processor 102, or data generated after at least one of the dedicated processor 101 or the general-purpose processor 102 runs the instructions, including but not limited to final data or intermediate data. Optionally, the memory 20 may be disposed independent of the processor 10, which is similar to that in FIG. 1. Alternatively, the memory 20 may be integrated with at least one of the dedicated processor 101 or the general-purpose processor 102. This is not limited in this embodiment of this application. At least one of the dedicated processor 101 and the general-purpose processor 102 executes program instructions stored in the memory 20, to enable the electronic device to implement the technical solution in any one of the following embodiments in FIG. 3 and FIG. 5 to FIG. 7.

It should be noted that, in this embodiment of this application, the dedicated processor 101 is a processor configured to perform neural network operation processing, and can perform an artificial intelligence operation. The dedicated processor 101 may include one or more processing units that are configured to perform a neural network operation. For example, a processing unit configured to perform the neural network operation may be a neural network processing unit (NPU). In addition, the dedicated processor in this embodiment of this application may be any other processor that has a neural network processing function, for example, a graphics processing unit (GPU) or a tensor processing unit (TPU).

The general-purpose processor 102 in this embodiment of this application is an operation and control core of a computing security system of the electronic device. The general-purpose processor 102 may include at least one of the following: one or more central processing units (CPU) or one or more micro control units (MCU). In addition, the general-purpose processor 102 may optionally include another type of a general-purpose processor, for example, may further include a digital signal processor (DSP), an application-specific integrated circuit (ASIC), a field programmable gate array (FPGA) or another programmable logic device, a transistor logic device, a hardware component, or any combination thereof. The another type of the general-purpose processor may be a microprocessor or a microcontroller, or may be any conventional processor.

It should be noted that the insecure software detection apparatus in this embodiment of this application may be the electronic device shown in FIG. 1, or may be the processor 10. In addition, the insecure software detection apparatus may be a processing apparatus in another form including the processor 10, for example, a chip system or a circuit board. A specific form of the insecure software detection apparatus is not limited in this embodiment of this application.

In this embodiment of this application, the insecure software detection apparatus may be specifically configured to: detect to-be-detected software by using two different neural network models, and perform security processing on the to-be-detected software when the insecure software detection apparatus detects that the to-be-detected software is not secure. The two different neural network models may be configured on the dedicated processor 101, or configured on the dedicated processor 101 and the general-purpose processor 102. This is specifically described below. The dedicated processor 101 in the insecure software detection apparatus may include only one neural network processing unit, or may include a plurality of neural network processing units. In a process in which the insecure software detection apparatus performs security detection on the to-be-detected software, there may be a plurality of different cases. For example, the dedicated processor 101 may separately analyze the to-be-detected software by using two different neural network models. When it is detected that the to-be-detected software is not secure, the general-purpose processor 102 performs the security processing on the to-be-detected software. Alternatively, the dedicated processor 101 and the general-purpose processor 102 may separately analyze the to-be-detected software by using different neural network models, and when it is detected that the to-be-detected software is not secure, the processor 102 performs the security processing on the to-be-detected software. Based on the foregoing plurality of different cases, the insecure software detection method provided in this embodiment of this application is separately described in detail below for the plurality of different cases.

A first case of the insecure software detection method provided in this embodiment of this application is first described. The dedicated processor 101 includes two different neural network processing units: a first neural network processing unit and a second neural network processing unit. For example, the first neural network processing unit and the second neural network processing unit are two different NPUs, that is, an NPU 1 and an NPU 2. The first neural network processing unit and the second neural network processing unit may separately analyze the to-be-detected software by using different neural network models. The two different neural network models are a first neural network model and a second neural network model. In this embodiment of this application, power consumption of the first neural network model is greater than power consumption of the second neural network, and a computing capability of the first neural network model is greater than a computing capability of the second neural network model. The computing capability may reflect an amount of data computing in a unit time. Generally, a neural network model with higher complexity has a higher computing capability and higher power consumption, and correspondingly, obtains a computation result with higher accuracy. Therefore, the first neural network model may be considered as a high-precision or high-complexity model, and the second neural network model may be considered as a low-precision or low-complexity model. For example, the first neural network model in this embodiment of this application may be a FLOAT16 model or FLOAT32 model, and the second neural network model may be an INT8 model. The NPU 1 has a small area, high energy efficiency, and ultra-low power consumption, and can perform continuous AI processing by using the second neural network model. The NPU 2 has a large area and a high computing capability, and can implement high accuracy and coverage by using the first neural network model. Therefore, operation effect of the first neural network model is better, and a more accurate result is obtained, but the first neural network model does not need to be always run.

For example, any one or more neural network models in the foregoing embodiments may be a neural network data structure, configured to implement a neural network operation, and may be implemented by using a software data model or embedded into a chip in a hardware manner, for example, embedded into any processing unit of the processor 10. The neural network model may be selectively implemented by using software, hardware, or a combination thereof. This is not limited in this embodiment.

Figure 3:
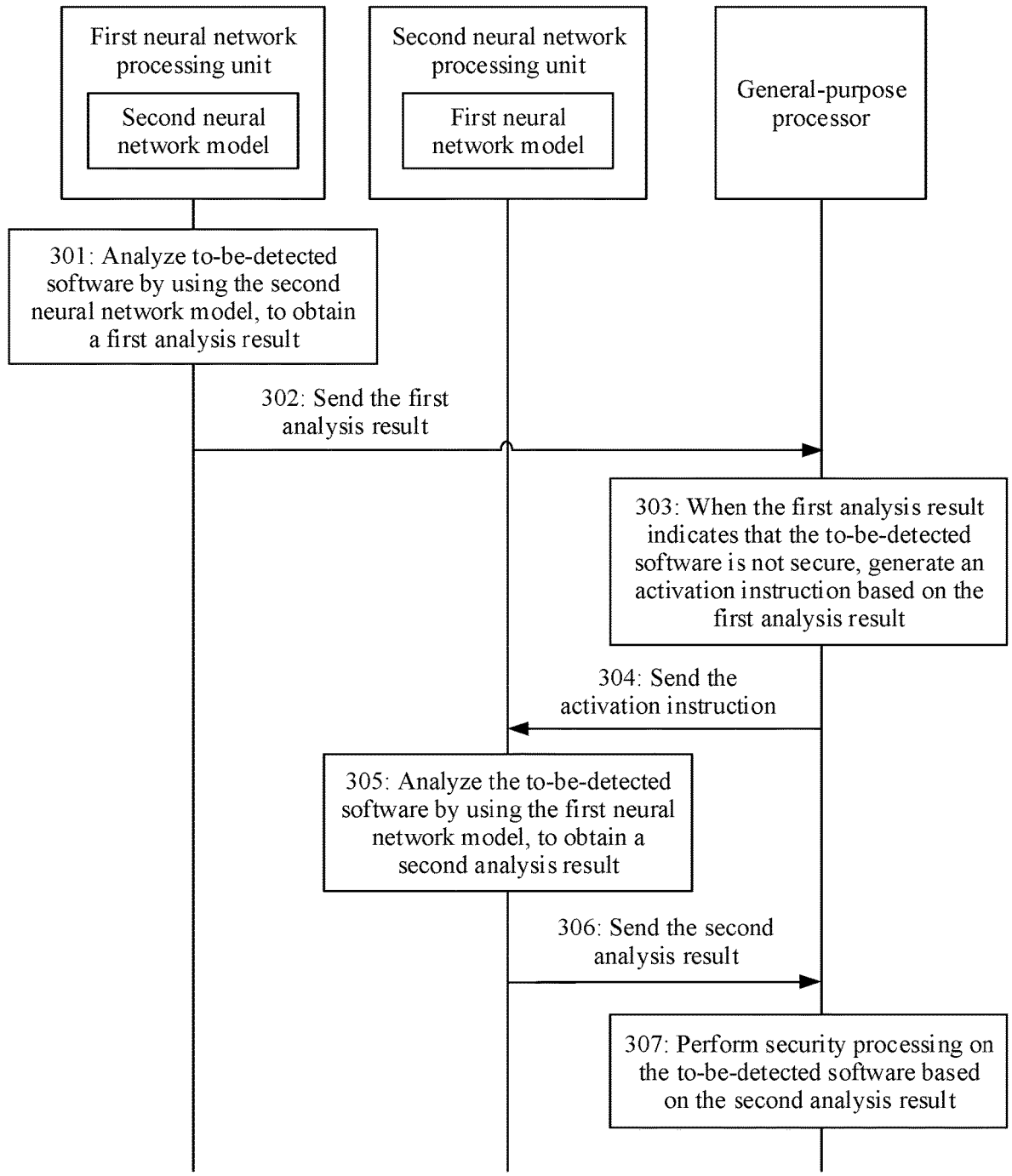
FIG. 3 is a schematic diagram of an embodiment of an insecure software detection method according to an embodiment of this application.

Based on the foregoing first case, FIG. 3 is a schematic diagram of an embodiment of an insecure software detection method according to an embodiment of this application.

Refer to FIG. 3. An embodiment of an insecure software detection method in embodiments of this application may include the following steps.

301: A first neural network processing unit analyzes to-be-detected software by using a second neural network model, to obtain a first analysis result.

In this embodiment of this application, the first neural network processing unit first analyzes the to-be-detected software by using the second neural network model, to obtain the first analysis result, where the first analysis result indicates whether the to-be-detected software is secure. In this embodiment of this application, the to-be-detected software being not secure may indicate that the to-be-detected software is insecure software or a virus, or indicate that the to-be-detected software may perform an insecure operation.

Figure 4:
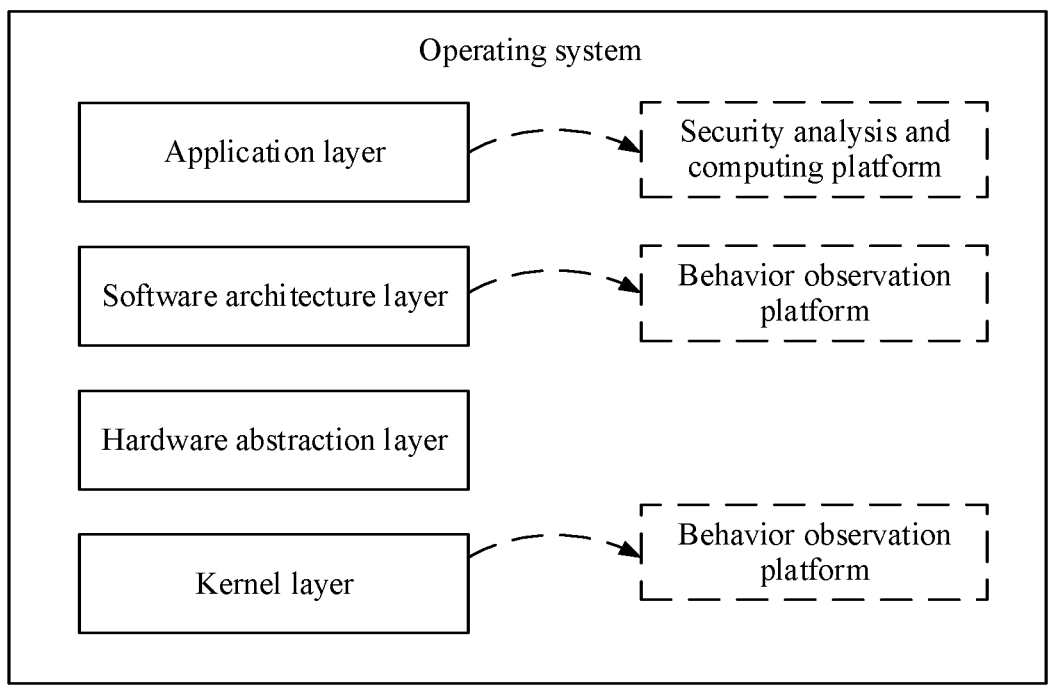
FIG. 4 is a schematic diagram of a software framework of an operating system according to an embodiment of this application.

An operating system corresponding to a processor in this embodiment generally includes an iOS operating system or an Android operating system, and both of the iOS operating system and the Android operating system include a software architecture layer and a kernel layer. In this embodiment of this application, an operating system of a terminal device runs on the general-purpose processor 102. For ease of description, in this embodiment of this application, the Android operating system is used as an example to show a schematic diagram of a software framework of an operating system running on a general-purpose processor, as shown in FIG. 4. The software framework of the operating system shown in FIG. 4 includes a kernel layer, a hardware abstraction layer, a software architecture layer, and an application layer. In this embodiment of this application, corresponding behavior observation platforms may be separately disposed at the software architecture layer and the kernel layer of the operating system, and the behavior observation platforms correspond to a monitoring-related software module, to monitor an observation event corresponding to the to-be-detected software. The behavior observation platform may be configured to set an observation point or an observation event of the second neural network model in the first neural network processing unit. A security analysis and computing platform is disposed at the application layer, and a behavior observation platform is disposed in the operating system, so that the dedicated processor 101 and the general-purpose processor 102 monitor, in real time, an observation event corresponding to the to-be-detected software, to implement scheduling and management of a neural network model and model analysis operation. The security analysis and computing platform corresponds to a security analysis and computing software module, and is configured to set various parameters required for security analysis and computing, for example, an execution period of monitoring, and may also set various parameters required for subsequent security processing.

In this embodiment of this application, the observation event monitored by the behavior observation platform disposed at the software architecture layer may include one or more of the following events: a lock screen event and a message, a window management event and a message, a focus event and a message, a location management event and a message, an application package and security management event and a message, a call and a message, an SIM card and a message, an SMS message event and a message, or a permission application event. The observation event monitored by the behavior observation platform disposed at the kernel layer may include one or more of observation events corresponding to the following six system application programming interfaces (API). The six system APIs are open, rename, renameat, unlink, unlinkat, or rmdir. It should be noted that observation events monitored by the behavior observation platforms disposed at the software architecture layer and the kernel layer may further include another type of an observation event. This is not limited in this embodiment of this application.

In this embodiment of this application, based on the settings of the behavior observation platform and the security analysis and computing platform, a specific manner in which the first neural network processing unit analyzes the to-be-detected software by using the second neural network model may be as follows: The first neural network processing unit analyzes, by using the second neural network model, a first observation event corresponding to the to-be-detected software, to obtain the first analysis result. The first observation event may include one or more of a plurality of observation events that need to be monitored and that are set at at least one of the software architecture layer or the kernel layer.

It should be noted that, in this embodiment of this application, because power consumption of the second neural network model is low, the first neural network processing unit may be specifically configured to analyze the to-be-detected software in real time by using the second neural network model, to implement real-time monitoring on the to-be-detected software with low power consumption. That the second neural network model in this embodiment of this application performs real-time analysis may include: The second neural network model periodically analyzes and processes an observation event, and keeps in a running state, to ensure system security.

302: The first neural network processing unit sends the first analysis result to a general-purpose processor. The sending may be triggered by an interruption, or may be performed by using an interface between the first neural network processing unit and the general-purpose processor. Specifically, when an interruption triggering manner is used, the first analysis result may be stored in the memory, and the interruption is used to notify the general-purpose processor of a storage address of the first analysis result in the memory, so that the general-purpose processor can obtain the first analysis result based on the address in response to the interruption.

303: When the first analysis result indicates that the to-be-detected software is not secure, the general-purpose processor generates an activation instruction based on the first analysis result. In this embodiment of this application, after the general-purpose processor receives the first analysis result sent by the first neural network processing unit, if the first analysis result indicates that the to-be-detected software is not secure, the general-purpose processor generates the activation instruction based on the first analysis result. In this embodiment of this application, the activation instruction specifically triggers the second neural network processing unit to enable the first neural network model, and then the second neural network processing unit analyzes the to-be-detected software by using the first neural network model. The activation instruction may be a signaling message or a notification message. After the second neural network processing unit receives the activation instruction, the second neural network processing unit immediately enables running of the first neural network model. In other words, the first neural network model is not originally run, and may be enabled to run when the first neural network model is triggered by the activation instruction. A form and a sending manner of the activation instruction are not limited in this embodiment of this application.

It should be understood that the first analysis result of the first neural network processing unit is indication information indicating that the to-be-detected software is not secure. Alternatively, the first analysis result may be a preliminary analysis result for determining non-security, and the general-purpose processor may further determine, based on an indication of the preliminary analysis result, that the to-be-detected software is not secure. This is not limited in this embodiment.

304: The general-purpose processor sends the activation instruction to a second neural network processing unit.

305. The second neural network processing unit enables the first neural network model based on the activation instruction, and analyzes the to-be-detected software by using the first neural network processing unit, to obtain a second analysis result. The second analysis result indicates whether the to-be-detected software is secure.

In this embodiment of this application, based on similar settings of the behavior observation platform and the security analysis and computing platform in step 301, a specific manner in which the second neural network processing unit analyzes the to-be-detected software by using the first neural network model may be as follows: The second neural network processing unit analyzes, by using the first neural network model, a second observation event corresponding to the to-be-detected software, to obtain the second analysis result. The second observation event may include one or more of a plurality of observation events that need to be monitored and that are set at at least one of the software architecture layer or the kernel layer in step 301. It should be noted that the first observation event and the second observation event in this embodiment of this application may be completely the same or partially the same, or may be completely different. This is not limited in this embodiment of this application.

It should be noted that, in this embodiment of this application, because power consumption of the first neural network model is higher than power consumption of the second neural network model, the first neural network model starts to perform processing or analysis only after the first neural network model is triggered by a running result of the second neural network model, instead of performing real-time processing. Therefore, power consumption is reduced. After the second neural network processing unit receives the activation instruction, the second neural network processing unit may start to invoke related data of the first neural network model stored in the memory to perform related processing.

Optionally, in this embodiment of this application, in addition to indicating that the to-be-detected software is not secure, the second analysis result obtained by the dedicated processor 101 by analyzing the to-be-detected software by using the first neural network model may further indicate a non-security type of the to-be-detected software. Optionally, in this embodiment of this application, the non-security type of the to-be-detected software may be one or more of the following non-security types: insecure fee deduction, privacy theft, ransomware, insecure information spreading, tariff increase, system attack, fraud, or hooliganism, or the like. It should be noted that, in this embodiment of this application, in addition to one or more of the foregoing non-security types, the non-security type of the insecure software may further include another non-security type. In addition, the non-security type of the insecure software may be classified in another classification manner. This is not limited in this embodiment of this application.

306: The second neural network processing unit sends the second analysis result to the general-purpose processor. For a manner of sending the second analysis result, refer to the manner of sending the first analysis result in step 302. Details are not described herein again.

307: The general-purpose processor performs security processing on the to-be-detected software based on the second analysis result.

It should be noted that, in this embodiment of this application, the general-purpose processor may perform the security processing on the to-be-detected software only based on the second analysis result. Alternatively, the general-purpose processor may perform the security processing on the to-be-detected software comprehensively based on the first analysis result and the second analysis result. For example, the general-purpose processor performs the security processing on the to-be-detected software based on weights of the first analysis result and the second analysis result. In other words, a comprehensive result obtained by weighting the first analysis result and the second analysis result determines whether to perform the security processing subsequently or which security processing is to be performed. This is not limited in this embodiment of this application.

Optionally, in this embodiment of this application, after it is determined that the to-be-detected software is not secure, the security processing performed by the general-purpose processor on the to-be-detected software may be a security limitation, and may include at least one of the following processing manners: stopping running the to-be-detected software, limiting at least a part of functions of the to-be-detected software, triggering an alarm, further performing security detection on the to-be-detected software, removing the to-be-detected software from an application store, or the like. Therefore, the security processing may be considered as an operation of responding to the foregoing analysis result by the general-purpose processor. A specific processing manner may be flexibly set. The foregoing examples are not intended to limit this solution. Only two examples are provided subsequently for description, but are not intended to limit the solution. A security processing manner that should be used by the general-purpose processor may be specifically corresponding to the non-security type that is of the to-be-detected software and that is indicated by the second analysis result. This is not limited in this embodiment. For example, if the non-security type is insecure fee deduction, the security processing performed by the general-purpose processor includes restricting a fee deduction or charging function of the to-be-detected software. For another example, if the non-security type is privacy theft, the security processing performed by the general-purpose processor includes stopping running the to-be-detected software.

That the general-purpose processor performs the security processing on the to-be-detected software based on weights of the first analysis result and the second analysis result may specifically include a plurality of manners. In an example, the first analysis result indicates that the to-be-detected software is not secure, that is, corresponds to a non-security level 1, and the second analysis result indicates that the to-be-detected software is not secure and corresponds to the non-security level 3. It is assumed that 1:1 weighting is performed on the first analysis result and the second analysis result, that is, addition is performed, and a non-security level 4 is obtained. It is assumed that a threshold is set to 2, and the obtained non-security level 4 is greater than the threshold 2. In this case, it is finally determined that the to-be-detected software is not secure. Optionally, based on the finally obtained non-security level 4, security processing corresponding to the level 4 may be performed. For example, a part of functions of the to-be-detected software are limited.

In another example, the first analysis result indicates that the to-be-detected software is not secure and corresponds to the non-security level 1, and the second analysis result indicates that the to-be-detected software is secure and corresponds to a non-security level 0. It is assumed that 1:2 weighting is performed on the first analysis result and the second analysis result, and the non-security level 1 is obtained. It is assumed that a threshold is set to 2, and the obtained non-security level 1 is less than the threshold 2. In this case, it is determined that the to-be-detected software is secure, and subsequent security processing or security limitation may not be performed.

In addition to performing weighting on the first analysis result and the second analysis result, the general-purpose processor may further determine, by using the first analysis result, that the to-be-detected software is not secure, and determine, by using the second analysis result, the security processing manner that needs to be performed. For example, the general-purpose processor uses the second analysis result to indicate the non-security type of the to-be-detected software, to perform security processing corresponding to the non-security type. This is not limited in this embodiment.

Optionally, in this embodiment of this application, a timer may be further configured for the second neural network processing unit. When the timer expires, the second neural network processing unit is automatically activated, and analyzes the to-be-detected software by using the first neural network model, to obtain an analysis result. This avoids a case in which the first neural network processing unit misses any detection, and effectively supplements detection of the first neural network processing unit.

In the technical solution provided in this embodiment of this application, the first neural network processing unit first analyzes the to-be-detected software by using the second neural network model with low power consumption. When the first analysis result obtained through analysis indicates that the to-be-detected software is not secure, the general-purpose processor triggers the second neural network processing unit to analyze the to-be-detected software by using the first neural network model with a high computing capability, to obtain the second analysis result. Finally, the general-purpose processor determines, based on the second analysis result, whether the to-be-detected software is insecure software. Therefore, power consumption is reduced while ensuring detection accuracy of the insecure software.

Figure 5:
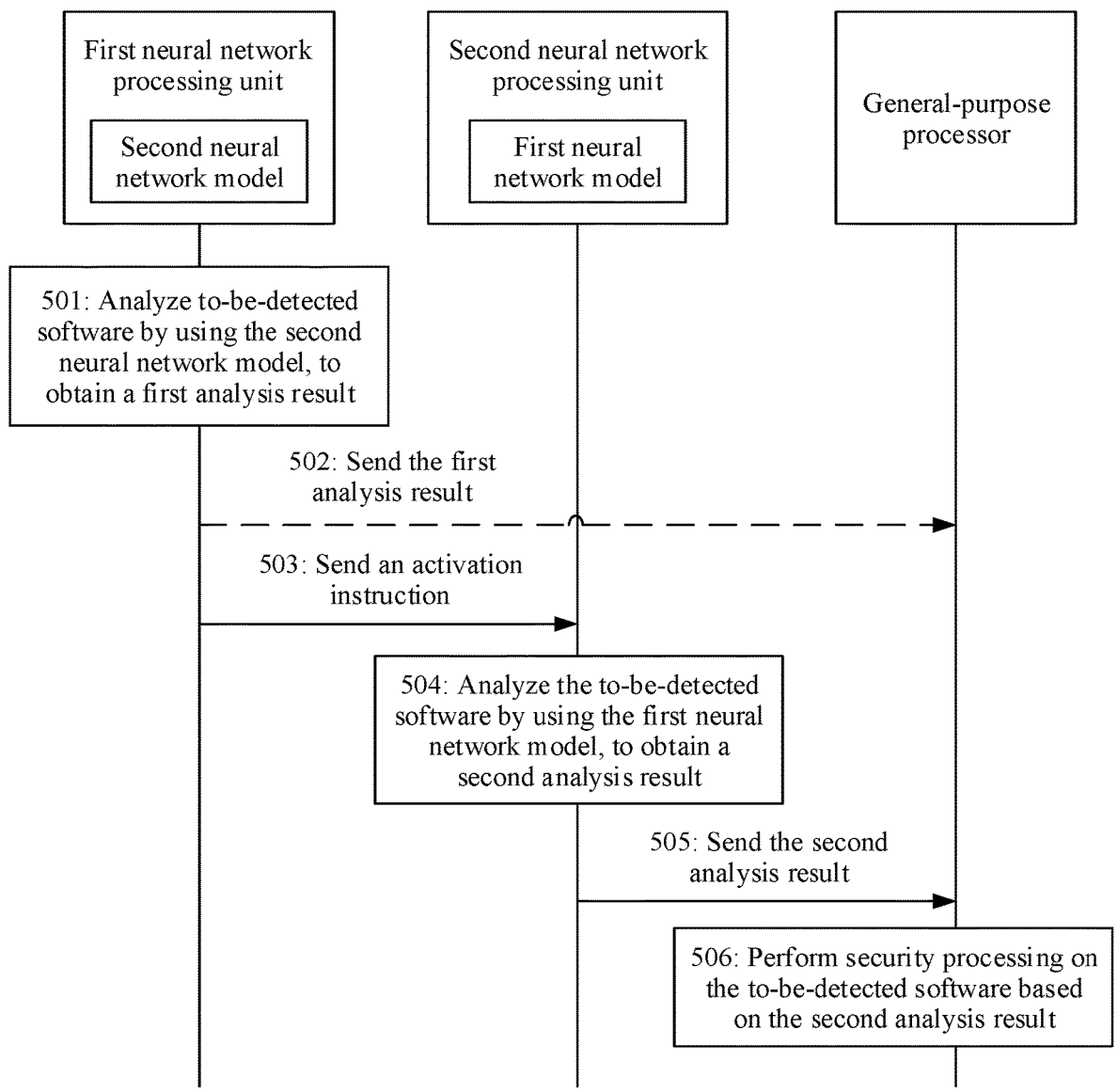
FIG. 5 is a schematic diagram of another embodiment of an insecure software detection method according to an embodiment of this application.

When the first analysis result obtained by the first neural network processing unit by analyzing the to-be-detected software by using the second neural network model indicates that the to-be-detected software is not secure, the foregoing describes a method for activating the second neural network processing unit by the general-purpose processor. In a first case, there may be a directly connected communication interface between the first neural network processing unit and the second neural network processing unit. When the first analysis result obtained by the first neural network processing unit by analyzing the to-be-detected software by using the second neural network model indicates that the to-be-detected software is not secure, the first neural network processing unit may directly activate the second neural network processing unit. FIG. 5 is a schematic diagram of another embodiment of an insecure software detection method according to an embodiment of this application. Refer to FIG. 5. The method may include the following steps.

501: A first neural network processing unit analyzes to-be-detected software by using a second neural network model, to obtain a first analysis result. Herein, refer to step 301 in FIG. 3 for understanding. Details are not described herein again.

502: The first neural network processing unit sends the first analysis result to a general-purpose processor. Herein, refer to step 302 in FIG. 3 for understanding. Details are not described herein again. It may be understood that this step is optional. If the general-purpose processor uses only the second analysis result of the second neural network processing unit in subsequent processing, this step may be omitted.

503: When the first analysis result indicates that the to-be-detected software is not secure, the first neural network processing unit sends an activation instruction to the second neural network processing unit. In this embodiment of this application, the activation instruction specifically activates the second neural network processing unit, so that the second neural network processing unit enables the first neural network model and analyzes the to-be-detected software by using the first neural network model. The activation instruction in this embodiment of this application may be a signaling message or a notification message. A form and a sending manner of the activation instruction are not limited in this embodiment of this application. The activation instruction may be directly generated when the first analysis result obtained by the first neural network processing unit by analyzing the to-be-detected software by using the second neural network model indicates that the to-be-detected software is not secure. Alternatively, the activation instruction may be the first analysis result. After the second neural network processing unit receives the first analysis result, the second neural network processing unit directly enables the first neural network model based on the first analysis result, to analyze the to-be-detected software.

504: The second neural network processing unit enables the first neural network model based on the activation instruction, and analyzes the to-be-detected software by using the first neural network model, to obtain a second analysis result. Herein, refer to step 305 in FIG. 3 for understanding. Details are not described herein again.

505: The second neural network processing unit sends the second analysis result to the general-purpose processor. Herein, refer to step 306 in FIG. 3 for understanding. Details are not described herein again.

506: The general-purpose processor performs security processing on the to-be-detected software based on the second analysis result. Herein, refer to step 307 in FIG. 3 for understanding. Details are not described herein again. It should be noted that the general-purpose processor may process only the second analysis result, or process the first analysis result and the second analysis result. In this embodiment of this application, when the general-purpose processor performs the security processing on the to-be-detected software only based on the second analysis result, step 502 in this embodiment of this application may be omitted.

In the technical solution provided in this embodiment of this application, the first neural network processing unit first analyzes the to-be-detected software by using the second neural network model with low power consumption. When the first analysis result obtained through analysis indicates that the to-be-detected software is not secure, the first neural network processing unit directly triggers the second neural network processing unit to enable the first neural network model with a high computing capability. Finally, the general-purpose processor determines, based on the second analysis result, whether the to-be-detected software is insecure software. Therefore, power consumption is reduced while ensuring detection accuracy of the insecure software.

The following describes a second case of the insecure software detection method provided in this embodiment of this application. The dedicated processor 101 includes only one neural network processing unit. The neural network processing unit may sequentially analyze the to-be-detected software by using different neural network models. The two different neural network models are a first neural network model and a second neural network model. In this embodiment of this application, similar to the foregoing embodiment, power consumption of the first neural network model is greater than power consumption of the second neural network, and a computing capability of the first neural network model is greater than a computing capability of the second neural network model. The first neural network model in this embodiment of this application may be a FLOAT16 or FLOAT32 model, and the second neural network model may be an INT8 model. The NPU can perform continuous AI processing by using the second neural network model, and can implement higher accuracy and coverage by using the first neural network model.

Figure 6:
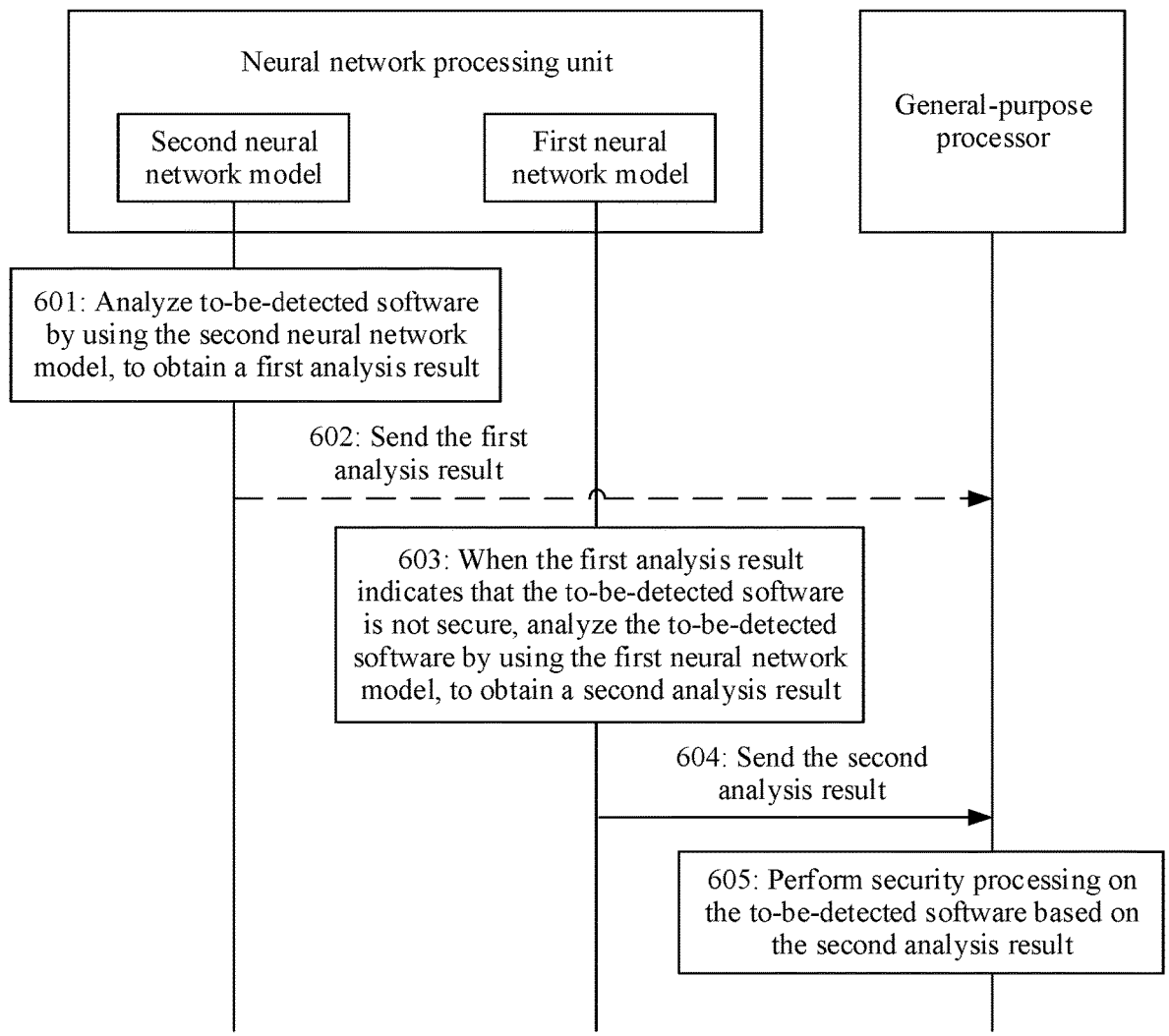
FIG. 6 is a schematic diagram of another embodiment of an insecure software detection method according to an embodiment of this application.

Based on the foregoing second case, as shown in FIG. 6, a schematic diagram of another embodiment of an insecure software detection method according to an embodiment of this application includes the following steps.

601: A neural network processing unit analyzes to-be-detected software by using a second neural network model, to obtain a first analysis result, where the first analysis result indicates whether the to-be-detected software is secure. For a specific process, refer to the description in the foregoing embodiment.

602: The neural network processing unit sends the first analysis result to a general-purpose processor. In this embodiment of this application, after the neural network processing unit analyzes the to-be-detected software by using the second neural network model and obtains the first analysis result, the neural network processing unit sends the first analysis result to the general-purpose processor. Herein, refer to step 302 in FIG. 3 for understanding. Details are not described herein again.

603: When the first analysis result indicates that the to-be-detected software is not secure, the first neural network model is enabled and the to-be-detected software is analyzed by using the first neural network model, to obtain a second analysis result, where the second analysis result indicates whether the to-be-detected software is secure. It may be understood that this step is optional. If the general-purpose processor uses only the second analysis result in subsequent processing, this step may be omitted. For a specific implementation process of this step, refer to the description in the foregoing embodiment. Details are not described herein again.

604: The neural network processing unit sends the second analysis result to the general-purpose processor. For a specific implementation solution, refer to the description in the foregoing embodiment.

605: The general-purpose processor performs security processing on the to-be-detected software based on the second analysis result. For understanding of this embodiment of this application, refer to step 307 in FIG. 3. Details are not described herein again.

It should be noted that, in this embodiment of this application, the general-purpose processor may process only the second analysis result, or process the first analysis result and the second analysis result. If the general-purpose processor performs the security processing on the to-be-detected software only based on the second analysis result, step 602 in this embodiment of this application may be omitted.

In this embodiment of this application, because power consumption of the second neural network model is low, the neural network processing unit may first perform real-time analysis on the to-be-detected software by using the second neural network model, to monitor the to-be-detected software in real-time with low power consumption. When the first analysis result obtained by performing the real-time analysis on the to-be-detected software indicates that the to-be-detected software is not secure, the neural network processing unit detects the to-be-detected software by using the first neural network model with a high computing capability, to obtain the second analysis result with higher accuracy. Finally, the general-purpose processor determines, based on the second analysis result, whether the to-be-detected software is insecure software. Therefore, power consumption is reduced while ensuring detection accuracy of the insecure software.

Finally, a third case of the insecure software detection method provided in this embodiment of this application is described. The dedicated processor 101 includes only one neural network processing unit. The general-purpose processor and the neural network processing unit may separately analyze the to-be-detected software by using different neural network models. The two different neural network models are a first neural network model and a second neural network model. In this embodiment of this application, power consumption of the first neural network model is greater than power consumption of the second neural network, and a computing capability of the first neural network model is greater than a computing capability of the second neural network model. The first neural network model in this embodiment of this application may be a FLOAT16 or FLOAT32 model, and the second neural network model may be an INT8 model. The general-purpose processor can perform continuous AI processing by using the second neural network model, and the neural network processing unit can implement higher accuracy and coverage by using the first neural network model.

Figure 7:
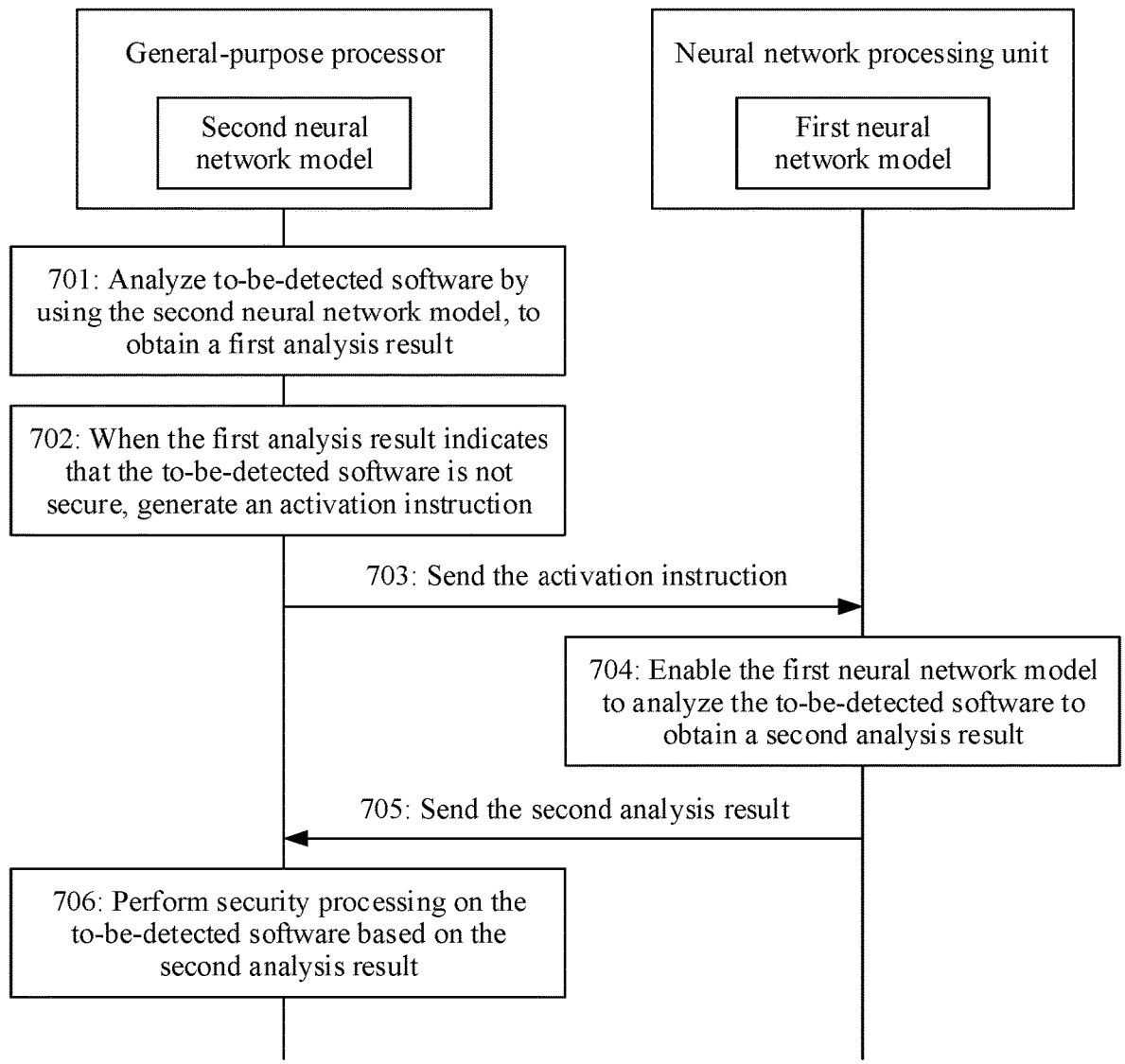
FIG. 7 is a schematic diagram of another embodiment of an insecure software detection method according to an embodiment of this application.

Based on the third case, as shown in FIG. 7, a schematic diagram of another embodiment of an insecure software detection method according to an embodiment of this application may include the following steps.

701: A general-purpose processor analyzes to-be-detected software by using a second neural network model, to obtain a first analysis result, where the first analysis result indicates whether the to-be-detected software is secure.

In this embodiment of this application, a specific manner in which the general-purpose processor analyzes the to-be-detected software by using the second neural network model may be as follows: Based on settings of a behavior observation platform and a security analysis and computing platform, the general-purpose processor analyzes, by using the second neural network model, a first observation event corresponding to the to-be-detected software, to obtain the first analysis result. The first observation event may include one or more of a plurality of observation events that need to be monitored and that are set at at least one of the software architecture layer or the kernel layer. In this embodiment of this application, for related content such as setting of the behavior observation platform and the security analysis and computing platform, and an observation event, refer to related content in step 301 in FIG. 3 for understanding. Details are not described herein again.

702: When the first analysis result indicates that the to-be-detected software is not secure, the general-purpose processor generates an activation instruction based on the first analysis result. The activation instruction in this embodiment of this application is specifically used to activate the neural network processing unit, so that the neural network processing unit enables the first neural network model. The activation instruction may be a signaling message or a notification message. A form and a sending manner of the activation instruction are not limited in this embodiment of this application.

703: The general-purpose processor sends the activation instruction to a neural network processing unit.

704: The neural network processing unit enables the first neural network model based on the activation instruction, and analyzes the to-be-detected software by using the first neural network model, to obtain a second analysis result, where the second analysis result indicates whether the to-be-detected software is secure.

In this embodiment of this application, a specific manner in which the neural network processing unit analyzes the to-be-detected software by using the first neural network model may be as follows: Based on settings of a behavior observation platform and a security analysis and computing platform, the neural network processing unit analyzes, by using the first neural network model, a second observation event corresponding to the to-be-detected software, to obtain the second analysis result. The second observation event may include one or more of a plurality of observation events that need to be monitored and that are set at at least one of the software architecture layer or the kernel layer. In this embodiment of this application, for related content such as setting of the behavior observation platform and the security analysis and computing platform, and an observation event, refer to related content in step 305 in FIG. 3 for understanding. Details are not described herein again.

705: The neural network processing unit sends the second analysis result to the general-purpose processor. For a specific implementation solution, refer to the foregoing embodiment.

706: The general-purpose processor performs security processing on the to-be-detected software based on the second analysis result.

For understanding of this embodiment of this application, refer to related content of step 307 in FIG. 3. Details are not described herein again.

In this embodiment of this application, because power consumption of the second neural network model is low, the general-purpose processor may first perform real-time analysis on the to-be-detected software by using the second neural network model, to monitor the to-be-detected software in real-time with low power consumption. When the first analysis result obtained by performing the real-time analysis on the to-be-detected software indicates that the to-be-detected software is not secure, the general-purpose processor activates the neural network processing unit to detect the to-be-detected software by using the first neural network model with a high computing capability, to obtain the second analysis result with higher accuracy. Finally, the general-purpose processor determines, based on the second analysis result, whether the to-be-detected software is insecure software. Therefore, power consumption is reduced while ensuring detection accuracy of the insecure software.

Figure 8:
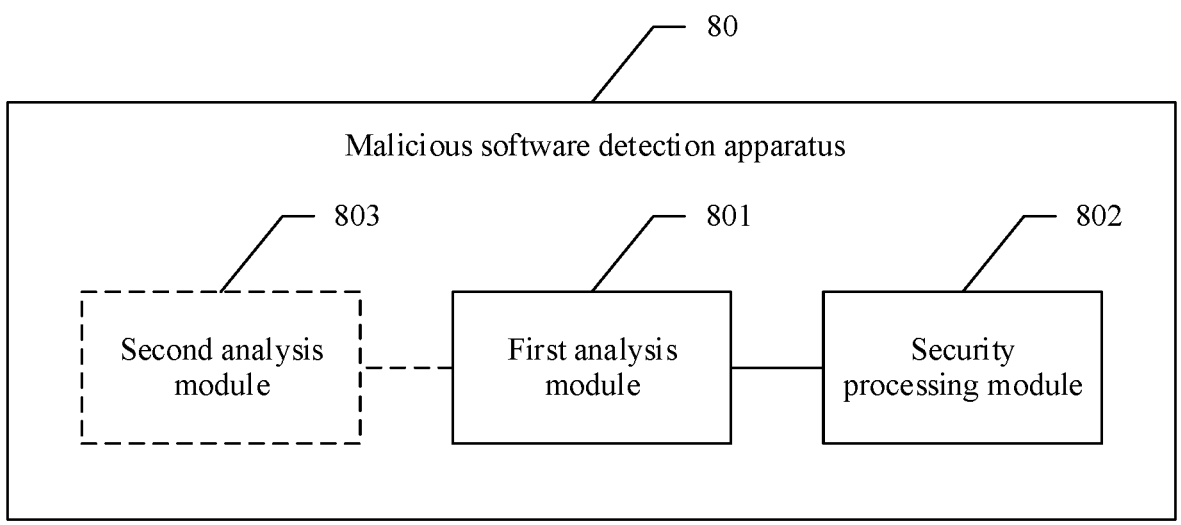
FIG. 8 is a schematic diagram of a structure of an insecure software detection apparatus according to an embodiment of this application.

FIG. 8 is a schematic diagram of a structure of an insecure software detection apparatus 80 according to an embodiment of this application. The insecure software detection apparatus 80 may include: a first analysis module 801, configured to: when a first analysis result indicates that to-be-detected software is not secure, enable a first neural network model and analyze the to-be-detected software by using the first neural network model, to obtain a second analysis result, where the first analysis result is obtained by analyzing the to-be-detected software by using a second neural network model, the second analysis result indicates that the to-be-detected software is not secure, power consumption of the first neural network model is greater than power consumption of the second neural network model, and a computing capability of the first neural network model is greater than a computing capability of the second neural network model; and a security processing module 802, configured to perform security processing on the to-be-detected software based on the second analysis result obtained through analysis by the first analysis module 801.

Optionally, in an embodiment, the second neural network model is used to perform real-time analysis on the to-be-detected software. Optionally, in an embodiment, the first analysis module 801 is further configured to analyze the to-be-detected software by using the second neural network model, to obtain the first analysis result. Optionally, in an embodiment, the insecure software detection apparatus 80 further includes: a second analysis module 803, configured to analyze the to-be-detected software by using the second neural network model, to obtain the first analysis result.

Optionally, in an embodiment, the first analysis result is obtained by analyzing, by using the second neural network model, a first observation event corresponding to the to-be-detected software. Optionally, in an embodiment, the second analysis result is obtained by the first analysis module 801 or the second analysis module 803 by analyzing, by using the first neural network model, a second observation event corresponding to the to-be-detected software. Optionally, in an embodiment, the security processing includes at least one of the following: stopping running the to-be-detected software, limiting at least a part of functions of the to-be-detected software, triggering an alarm, or further performing security detection on the to-be-detected software.

Optionally, in an embodiment, the security processing module 802 is configured to perform the security processing on the to-be-detected software based on the first analysis result and the second analysis result. Optionally, in an embodiment, the second analysis result further indicates a non-security type of the to-be-detected software.

It should be understood that the first analysis module 801 in this embodiment of this application may be implemented by a circuit component in a dedicated processor, a circuit component in a general-purpose processor, or a software program module run by the dedicated processor or the general-purpose processor. The security processing module 802 may be implemented by a circuit component in the general-purpose processor or a software program module run by the general-purpose processor. The second analysis module 803 may be implemented by a circuit component in the dedicated processor or a software program module run by the dedicated processor. Therefore, it may be understood that at least one module in the apparatus 80 may be implemented by software, hardware, or a combination thereof. In a typical implementation solution, at least one module in the apparatus 80 is a software module including a software program, and the software module may run on the processor 10 shown in FIG. 1, for example, at least one of a general-purpose processor and a dedicated processor, to implement the technical solution of this embodiment. It should be understood that for specific operations and implementations of the foregoing modules, refer to the description in the foregoing embodiments.

Optionally, an embodiment of this application provides a chip system. The chip system includes a dedicated processor and a general-purpose processor. At least one of the dedicated processor and the general-purpose processor is configured to support an electronic device in implementing the foregoing insecure software detection method. In a possible design, the chip system further includes a memory. The memory is configured to store program instructions and data that are necessary for the electronic device. The chip system may include a chip, or may include a chip and another discrete device. This is not specifically limited in this embodiment of this application.

Based on the foregoing analysis, the method steps in this embodiment of this application may be implemented by hardware, or may be implemented by a general-purpose processor by executing software instructions. The software instructions may include a software module. The software module may be stored in a random access memory (RAM), a flash memory, a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), a register, a hard disk, a removable hard disk, a CD-ROM or any other form of storage medium well-known in the art. For example, a storage medium is coupled to a processor, so that the processor can read information from the storage medium or write information into the storage medium. Certainly, the storage medium may alternatively be a component of the processor. The processor and the storage medium may be disposed in an ASIC. In addition, the ASIC may be located in the electronic device. Certainly, the processor and the storage medium may alternatively exist in the electronic device as discrete components.

All or some of the foregoing embodiments may be implemented by using software, hardware, firmware, or any combination thereof. When software is used to implement the embodiments, all or some of the embodiments may be implemented in a form of a computer program product. The computer program product includes one or more computer programs or instructions. When the computer programs or the instructions are loaded and executed on a computer, the procedures or the functions according to embodiments of this application are all or partially implemented. The computer may be a general-purpose computer, a dedicated computer, a computer network, or another programmable apparatus. The computer programs or the instructions may be stored in a computer-readable storage medium, or may be transmitted through the computer-readable storage medium. The computer-readable storage medium may be any usable medium accessible by a computer, or a data storage device such as a server integrating one or more usable media. The usable medium may be a magnetic medium, for example, a floppy disk, a hard disk, or a magnetic tape; may be an optical medium, for example, a DVD; or may be a semiconductor medium, for example, a solid-state drive (SSD).

In embodiments of this application, unless otherwise stated or there is a logic conflict, terms or descriptions between different embodiments are consistent and may be mutually referenced, and technical features in different embodiments may be combined based on an internal logical relationship thereof, to form a new embodiment. In this application, "at least one" means one or more, and "a plurality of" means two or more.

It may be understood that various numbers in embodiments of this application are merely used for differentiation for ease of description, and are not used to limit the scope of embodiments of this application. The sequence numbers of the foregoing processes do not mean execution sequences. The execution sequences of the processes should be determined based on functions and internal logic of the processes.

The foregoing describes in detail the insecure software detection apparatus, the insecure software detection method, and the storage medium that are provided in embodiments of the present invention. Specific examples are used in this specification to describe principles and implementations of this application. The foregoing embodiments are merely used to help understand the method and core ideas of this application. In addition, a person of ordinary skill in the art may make modifications to the specific implementations and application scopes according to the idea of this application. In conclusion, this specification shall not be construed as a limitation on this application.

The invention claimed is:

1. An apparatus, comprising:
a processor, configured to:
analyze a software by using a second neural network model having a second power consumption and a second computing capability, to obtain a first analysis result indicating that the software is not secure; and
in response to the first analysis result, analyze the software by using a first neural network model having a first power consumption and a first computing capability, to obtain a second analysis result, wherein the first power consumption of the first neural network model is greater than the second power consumption of the second neural network model, and the first computing capability of the first neural network model is greater than the second computing capability of the second neural network model; and a general-purpose processor, configured to:
obtain the second analysis result from the processor, and
perform security processing on the software based on the second analysis result.

2. The apparatus according to claim 1, wherein the second neural network model is used to perform real-time analysis on the software.

3. The apparatus according to claim 1, wherein the processor is further configured to: in response to the first analysis result, activate the first neural network.

4. The apparatus according to claim 1, wherein the processor comprises a first neural network processing unit and a second neural network processing unit;
the first neural network processing unit is configured to analyze the software by using the second neural network model, to obtain the first analysis result; and
the second neural network processing unit is configured to: in response to the first analysis result, activate the first neural network model, and analyze the software by using the first neural network model, to obtain the second analysis result.

5. The apparatus according to claim 1, wherein the first analysis result is obtained by analyzing, using the second neural network model, a first observation event corresponding to the software.

6. The apparatus according to claim 1, wherein the second analysis result is obtained by analyzing, using the first neural network model, a second observation event corresponding to the software.

7. The apparatus according to claim 1, wherein the security processing comprises at least one of the following: stopping running the software, limiting at least a part of functions of the software, triggering an alarm, or further performing security detection on the software.

8. The apparatus according to claim 1, wherein
the general-purpose processor is further configured to obtain the second analysis result from the processor, and is specifically configured to perform the security processing on the software based on the first analysis result and the second analysis result.

9. The apparatus according to a claim 1, wherein the second analysis result further indicates a non-security type of the software.

10. An insecure software detection method, comprising:
analyzing, by a processor, a software using a second neural network model that has a second power consumption and a second computing capability, to obtain a first analysis result indicating that the software is not secure;
analyzing, by the processor in response to the first analysis result, the software using a first neural network model that has a first power consumption and a first computing capability, to obtain a second analysis result, wherein the first power consumption of the first neural network model is greater than the second power consumption of the second neural network model, and the first computing capability of the first neural network model is greater than the second computing capability of the second neural network model; and performing, by a general-purpose processor, security processing on the software based on the second analysis result.

11. A non-transitory computer-readable storage medium, comprising instructions, wherein when the instructions are run on an electronic device including a processor and a general-purpose processor, wherein the instructions include first instructions for causing the processor to:
analyze a software by using a second neural network model having a second power consumption and a second computing capability, to obtain a first analysis result indicating that the software is not secure; and
in response to the first analysis result, analyze the software by using a first neural network model having a first power consumption and a first computing capability, to obtain a second analysis result, wherein the first power consumption of the first neural network model is greater than the second power consumption of the second neural network model, and the first computing capability of the first neural network model is greater than the second computing capability of the second neural network model; and
wherein the instruction include second instructions for causing the general purpose processor to:
perform security processing on the software based on the second analysis result.

12. The non-transitory computer-readable storage medium according to claim 11, wherein the second neural network model is used to perform real-time analysis on the software.

13. The non-transitory computer-readable storage medium according to claim 11, wherein the processor comprises a first neural network processing unit and a second neural network processing unit,
the first instructions include third instructions for causing the first neural network processing unit to analyze the software by using the second neural network model, to obtain the first analysis result; and
the first instructions include fourth instructions for causing the second neural network processing unit to enable the first neural network model, and analyze the software by using the first neural network model, to obtain the second analysis result.

14. The non-transitory computer-readable storage medium according to claim 11, wherein the first analysis result is obtained by analyzing, using the second neural network model, a first observation event corresponding to the software.

15. The non-transitory computer-readable storage medium according to claim 11, wherein the second analysis result is obtained by analyzing, using the first neural network model, a second observation event corresponding to the software.

16. The non-transitory computer-readable storage medium according to claim 11, wherein the security processing comprises at least one of the following: stopping running the software, limiting at least a part of functions of the software, triggering an alarm, or further performing security detection on the software.

17. The non-transitory computer-readable storage medium according to claim 11, wherein
the security processing on the software is performed based on the first analysis result and the second analysis result.

* * * * *